United States Patent [19]

Anderson

[11] Patent Number: 4,483,098
[45] Date of Patent: Nov. 20, 1984

[54] PLANT STAKE AND CLASP
[75] Inventor: Dennis C. Anderson, Northfield, Minn.
[73] Assignee: National Polymers Inc., Lakeville, Minn.
[21] Appl. No.: 425,972
[22] Filed: Sep. 28, 1982
[51] Int. Cl.³ .............................................. A01G 17/06
[52] U.S. Cl. ............................................ 47/47; 47/44
[58] Field of Search .................... 47/47, 44, 45, 46; 24/68 J

[56] References Cited

U.S. PATENT DOCUMENTS

| 1,536,678 | 5/1925 | Markowski | 47/47 |
| 2,444,028 | 6/1948 | Bliss et al. | 24/68 J |
| 3,579,908 | 5/1971 | Morgan | 47/45 |

FOREIGN PATENT DOCUMENTS

| 8474 | 12/1879 | Fed. Rep. of Germany | 47/47 |
| 2303234 | 7/1974 | Fed. Rep. of Germany | 47/44 |
| 397650 | 8/1933 | United Kingdom | 47/47 |
| 1029525 | 5/1966 | United Kingdom | 47/47 |

Primary Examiner—Robert A. Hafer
Assistant Examiner—Bradley M. Lewis
Attorney, Agent, or Firm—James V. Harmon

[57] ABSTRACT

A plant stake and clasp is provided in which one or more clasps molded from plastic resin are provided at the top of the stake, each clasp including a pair of cooperating resilient arms and a mouth through which the stem of the plant can be introduced.

5 Claims, 7 Drawing Figures

PLANT STAKE AND CLASP

FIELD OF THE INVENTION

The present invention relates to plant supports and more particularly to a plant support in the form of a stake having a clasp adapted to surround the plant stem.

THE PRIOR ART

Numerous supporting devices have been provided for plants such as vines, tomato plants, as well as plants growing in pots. Most common are simply stakes to which a tie wire is fastened to secure the plant to the stake. Other forms of wire connectors are used such as wire finger-like elements that enclose the plant stem. In still other such devices a clasp is employed which comprises a band of material formed into a spiral with two overlapping segments. These segments have to be manipulated or uncoiled manually to place the plant stem in the center of the spiral. This takes time and is cumbersome to perform. When ordinary twist ties are used, they have a tendency to become lost. Moreover, the twisting operation is time consuming.

One of the problems faced by plant growers to which the present invention is addressed concerns the problem of damage that occurs during shipment to the marketplace. Thus, many growers find it necessary or desirable to at least partially support the upper part of the stem when the plant is ready to be shipped to market to prevent breakage from the natural jostling the plants get during shipment. These makeshift supports hold the upper part of the plant and help reduce the chances that the stem will be broken.

Another problem to which the present invention is addressed is the support of food producing plants such as tomato plants which are shipped to retail outlets in a partially grown condition. These plants, especially those that are more mature, have a tendency to become broken so that some means of support for the stem is desirable.

In the development of the present invention, various designs were considered and tried. It was discovered that one of the problems involved in developing the invention was due to the requirement for the use of a relatively simple plastic injection mold that could be inexpensively manufactured and maintained and yet would operate effectively to produce an efficient device for both supporting the plant and clasping the stem. In the course of this development, various designs were considered in which a clasp was provided including a pair of resilient arms to hold the stem. It was found that the molding of such a clasp required a relatively complicated mold. It was therefore decided to try to find a way to mold the stake and clasp with the entire assembly in a laid out or flat condition which will be described more fully below and which consequently would not require the use of complex molds that are expensive to manufacture and maintain. The resulting clasp and stake should nevertheless be highly effective in operation and be very simply placed in condition for use. Moreover, the design should enable the grower to place the stem in the clasp merely by applying finger pressure to force the stem to its supported position in the clasp. In addition, it is desirable to provide a design that is easy to mold using conventional injection molding machinery and is secure, rugged in construction and economical with respect to the amount of resin used.

SUMMARY OF THE INVENTION

The invention concerns a combined plant stake and clasp comprising an elongated vertically disposed plant stake, the lower end of which may be forced into the earth within a plant pot or into the ground. The stake projects vertically and includes at its upper end an integral clasp including a pair of opposed left and right arms each having the form of a semi-circle. The arms terminate in adjacent free ends which are usually contacting one another and are provided with diverging ears that project outwardly, i.e., away from the stake. The diverging ears define a mouth between the free ends of the arms adapted to receive the plant stem. In this way during use after the plant stake has been inserted into the ground, the stem may be placed in the clasp by exerting light manual pressure to force the mouth of the clasp open as the diverging ears are pressed apart by the stem moving between them. Finally, the mouth will snap shut around the stem holding it within the clasp, i.e., between the arms of the clasp.

In one preferred form of the invention, the clasp is laid flat when first formed, e.g., by injection molding. The halves of each clasp are connected together by means of a flexible strap and a fastener such as a pin and pin opening are provided in the adjacent parts to permit the clasp to be placed in the operating condition with the arms opposite one another and their free ends touching or nearly touching.

THE FIGURES

DESCRIPTION OF THE PREFERRED EMBODIMENT

Refer to the figures and particularly to FIGS. 1 through 4.

Figure 1:
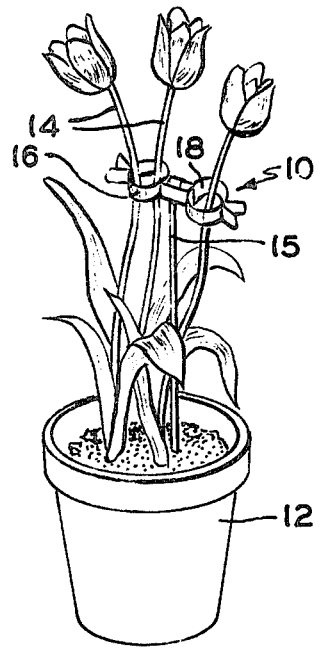
FIG. 1 is a perspective view of the invention as it appears during use supporting the stems of potted plants.

Shown in FIG. 1 is a combination plant stake and clasp in accordance with the invention designated by the numeral 10. It includes an elongated vertically disposed stake portion 15 which during use is forced into the earth within a pot 12 for supporting the stems 14 of a growing plant. The upper end of the stake is an integral clasp means which in this instance comprises a pair of circular or ring-shaped clasps 16 and 18, each having a central opening for supporting one of the stems 14. The unitary stake and clasp is preferably formed from injection molded plastic. While a variety of resins can be used, polypropylene has been found satisfactory. The stake may have any suitable crossection such as round or square but in this instance comprises a shaft of rectangular configuration having a pair of diametrically opposed longitudinally extending reinforcing ribs 15a and 15b giving the shaft a crossectional configuration of a Maltese cross.

Figure 2:
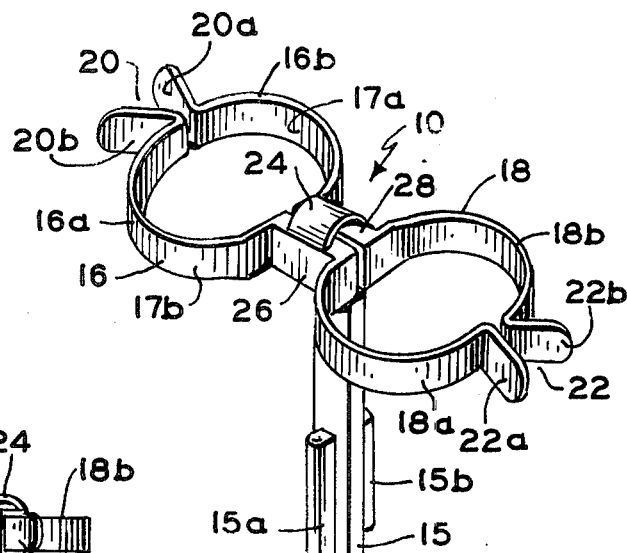
FIG. 2 is a perspective view on an enlarged scale of the upper end of the combination stake and clasp.
Figure 3:
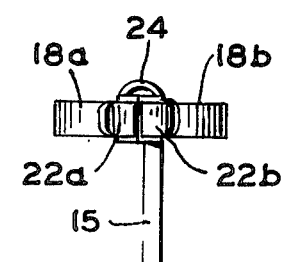
FIG. 3 is an end elevational view of the combination stake and clasp of FIGS. 1 and 2 in its operating condition.
Figure 4:
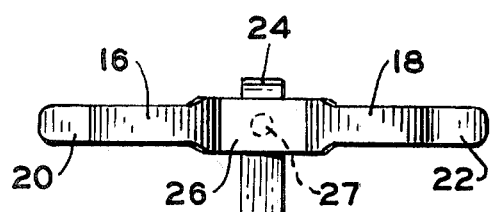
FIG. 4 is a side elevational view of the clasp shown in the prior figures.

The clasps will now be described in more detail in their operating position as shown in FIGS. 2, 3 and 4. As can be clearly seen, the clasp 16 includes a pair of opposite cooperating ring-shaped arms 16a and 16b each semi-circular in shape while the clasp 18 includes opposed semi-circular arms 18a and 18b. These arms are resilient and will spring toward each other to hold the stem 14 in place as will be described more fully below. At the free ends of the arms of clasp 16 are diverging ears 20a and 20b that extend away from the connected end of the arms to define a mouth 20. Similarly, the clasp 18 includes diverging ears 22a and 22b that extend away from the connected ends of the arms to form a mouth 22. The arms of clasp 16 have flat inner and outer surfaces 17a and 17b thus giving the clasp the shape of a short section of tubing disposed vertically with a flat inner surface 17a that will hold the plant stems in place effectively without cutting into them. The clasp 18 has a similar configuration with a flat inner surface 21a that will hold the stems in place without damaging their surfaces.

When the combination stake and clasp is to be used, the stake portion 15 is inserted into the earth as described above. The plant stems 14 are then pressed with light finger pressure into the mouths 20 and 22 whereupon the arms 16a-16b and 18a-18b will spread apart as the stems pass between the ears and in this way will be easily introduced into the center opening of each of the clasps whereupon the resiliency of the arms will cause the mouths to snap shut around them securely holding the stems in place. The diverging ears can thus be thought of as wraps or cam surfaces adapted to spread the arms as the stems are moved toward the center of the clasps. In this way, the stems are easily introduced but once inside will not fall out easily.

Figure 5:
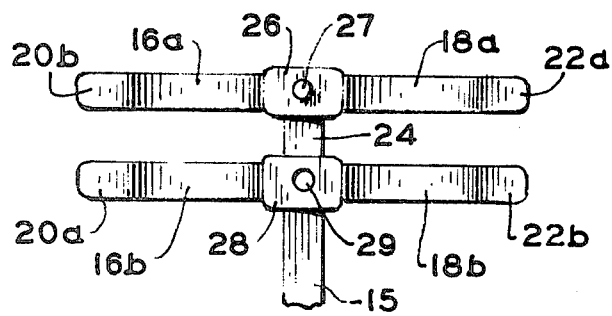
FIG. 5 is a side elevational view of the clasp of FIGS. 1 through 4 as it appears after being removed from the plastic injection mold and prior to placing it in the operating condition of FIGS. 1 through 4.
Figure 6:
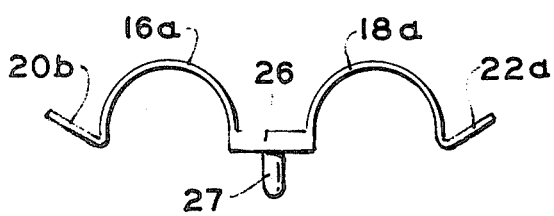
FIG. 6 is a top view of the stake and clasp of FIG. 5.

The construction and operation of the clasp has been described thus far in its operating position. However, when the clasp is formed by injection molding, it is molded and initially assumes the configuration shown in FIGS. 5 and 6. As shown in the figures, the arms 16b and 18b extend from a supporting block 28 molded integrally to the upper end of the stake 15. The block 28 includes a horizontally disposed laterally extending bore or hole 29. Extending upwardly from the block 28 is a flexible strap 24 to the free end of which is connected a supporting block 26 to which the ends of arms 16a and 18a are connected (FIG. 5). Extending laterally from the center of the block 26 is a suitable connector 27 of just the appropriate size to fit the hole 29. In this way, the clasp after being removed from the mold in the condition shown in FIGS. 5 and 6, that is to say, with the arms in longitudinal alignment, the block 26 is brought downwardly by bending the flexible strap 24 and the pin 27 is inserted to hold 29. The clasp now takes the configuration of FIGS. 1 through 4 and is ready for use. However, by molding the clasp in the flat or laid out condition shown in FIGS. 5 and 6 with the cooperating arms 16a, 16b and cooperating arms 18a, 18b in longitudinal alignment, a mold of very simple construction can be used. This reduces manufacturing and maintenance costs for the molds and helps to assure that the free ends of the arms will remain in contact with one another during use.

Figure 7:
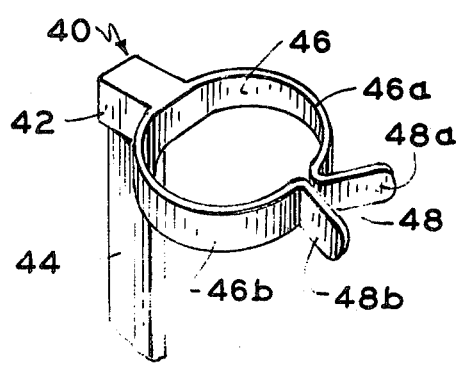
FIG. 7 is a modified form of the invention.

Refer now to FIG. 7 which illustrates a modified form of the invention wherein no assembly step is required. In this instance, a combination stake and clasp 40 is provided with a vertically disposed elongated stake 44 having an arm supporting block 42 at its upper end to which is connected a clasp 46 composed of a pair of horizontally disposed left and right cooperating arms 46a and 46b each of semi-circular configuration to provide a clasp in the form of a ring or circle and at their free ends including diverging ears 48a and 48b that extend away from the stake 44 from the adjacent free ends of the arms to define a mouth 48 for the insertion of the stems 14. Again, the resiliency of the material from which the arms is formed holds their free ends normally in contact but allows the stem 14 to be forced using light finger pressure into the mouth while the diverging angular relationship of the ears 48a, 48b will serve as ramps or cam surfaces enable the stem to be easily moved into the inside of the clasp between the arms. The arms then snap back to their closed position with free ends in contact securing holding the stems in place. In this case, the preliminary step of folding the arms into the operating position is not needed, however, a more complicated mold is required.

It can thus be seen that the invention provides a highly effective one piece stake and clasp that is extremely easy to use and will reliably hold the stems in place once inserted may save time, effort and frustration in the placement of the stems in the supportive position and at the same time are inexpensive to produce. Moreover, the smooth inner surfaces and tubular configuration of the ring-shaped clasp will securely hold the plants in place without damaging them.

Variations in the invention will be apparent to those skilled in the art within the scope of the appended claims once the principles disclosed are understood.

By blanking off one side of the mold, the clasp 18 can be eliminated if desired, leaving only clasp 16.

What is claimed is:

1. A combination plant stake and clasp injected molded from a single piece of plastic resinous material comprising,
   an elongated vertically disposed plant stake having a longitudinal axis,
   a clasp at the top end of the stake including a pair of resilient arms of arcuate shape,
   said arms being laid out in a flat configuration such that the arms are spaced longitudinally with respect to one another along the longitudinal axis of the stake,
   each of the arms has a connected end and the connected ends of the arms are each integral with a support body,
   one of said support bodies is integral with the top end of the stake, a flexible strap integral with the support bodies and connecting them together, said clasp being foldable to an operating position by bending the strap,
   a connector means is provided for securing the supporting bodies to one another whereby, with the stake oriented in a vertical position, one of the bodies can be brought downwardly by bending the strap and said bodies secured to one another by said connector means to place said arms in left and right bilaterally opposed cooperating relationship having free ends adjacent to one another to form a clasp of circular configuration,
   said clasp having flat inner surfaces, the flat inner surfaces of the clasp thereby retaining the stems of the plants in place without injury, the ends of the arms having diverging ears defining a mouth between them, said divergent ears serving as cam surfaces to cause the free ends of the arms to spread apart as the plant stem is forced by light finger pressure into the mouth between them allowing the stem to pass into the center of the clasp between the arms whereupon the resiliency of the arms will cause the mouth to snap shut around the stem, holding it in place within the clasp, whereby molding of the entire article is facilitated by positioning the arms apart from one another in a flat configuration to permit separation of a simple plastic injection mold allowing the entire article to be removed from the mold.

2. The article of claim 1 wherein a plurality of clasps are provided at the top of each stake.

3. Clasp of claim 1 wherein two horizontally disposed diametrically opposed clasps are provided at the top of said stake and extend in opposite directions therefrom.

4. The article of claim 1 wherein the stake and the clasp are formed intergrally from plastic resin and said stake has an elongated shaft with at least one longitudinally ending rib integral therewith for reinforcing it.

5. The article according to claim 1 wherein the connecting means comprises a pin located in a horizontally disposed laterally extended position projecting from one of said bodies and the other of said bodies includes a cooperating opening for receiving said pin.

* * * * *